US010988070B2

(12) United States Patent
Subramanian et al.

(10) Patent No.: US 10,988,070 B2
(45) Date of Patent: Apr. 27, 2021

(54) FRUNK AND TRUNK STORAGE BAGGAGE RETENTION AND REMAINDER

(71) Applicant: GM Global Technology Operations LLC, Detroit, MI (US)

(72) Inventors: Vijayasarathy Subramanian, Virudhunagar (IN); Keshava R. R V, Bengaluru (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 200 days.

(21) Appl. No.: 16/154,135

(22) Filed: Oct. 8, 2018

(65) Prior Publication Data

US 2020/0108763 A1    Apr. 9, 2020

(51) Int. Cl.
*B60P 7/08*    (2006.01)
*B60R 7/02*    (2006.01)
*B60R 11/00*   (2006.01)

(52) U.S. Cl.
CPC .............. *B60P 7/0823* (2013.01); *B60R 7/02* (2013.01); *B60R 2011/0036* (2013.01)

(58) Field of Classification Search
CPC .. B60P 7/0823; B60R 7/02; B60R 2011/0036; B60R 22/00; B60R 2022/4816; B60R 22/48; B60R 2022/005; B60R 22/26; B60R 7/04; A45C 13/42

USPC .................................................. 410/97, 100
See application file for complete search history.

(56) References Cited

U.S. PATENT DOCUMENTS

| 6,007,283 A * | 12/1999 | Labeur ..................... B60R 7/02 410/100 |
| 2008/0284192 A1* | 11/2008 | Lim .......................... B60R 7/02 296/37.5 |
| 2020/0247304 A1* | 8/2020 | Fowler .................. B60P 7/0876 |

* cited by examiner

*Primary Examiner* — Stephen T Gordon

(57) ABSTRACT

A baggage storage and retention system includes a first vehicle seat receiving a first passenger in a vehicle. A second vehicle seat of the vehicle receives a second passenger. Each vehicle seat has a seatbelt assembly generating a seatbelt locked signal when one of the first or second passengers seated in the vehicle seat closes the seatbelt assembly defining a seatbelt closed condition. A vehicle storage compartment has multiple strap and/or lock assemblies. A first strap assembly generates a first strap locked signal when a first baggage item of the first passenger is placed in the vehicle storage compartment, engaged with the first baggage item and closed defining a strap assembly closed condition. A passenger and baggage identification system receives the seatbelt locked signal and the first strap locked signal and links the first passenger to the first seat and the first baggage item to the first passenger.

10 Claims, 5 Drawing Sheets

FRUNK AND TRUNK STORAGE BAGGAGE RETENTION AND REMAINDER

The present disclosure relates to containment systems for the storage of items such as baggage in vehicle and people mover storage spaces.

In shared ride vehicles including electric powered or autonomously operated vehicles, a storage compartment space such as in a trunk or a frunk (front compartment) will be shared by multiple users. As different passengers are met by the vehicle, the luggage, bags or packages, collectively referred to herein as "baggage" of each new passenger is added, sometimes onto or mixed in with the baggage of a previously loaded passenger. There is presently no system available to avoid mixing up the baggage of different passengers that is stored in the trunk or the frunk that are shared by multiple passengers during a ride share event. There is also presently no system available to ensure that a departing passenger can only remove his or her previously loaded baggage pieces, or that notifies a departing passenger if one or more baggage pieces have not been removed from the vehicle.

In addition, there is currently no system available to identify to a new passenger if a vehicle the new passenger is attempting to access has sufficient storage space for the quantity or size of baggage pieces the passenger is carrying. There is therefore no currently available system for a new passenger to reserve available storage space ahead of accessing the vehicle.

Thus, while current vehicle storage compartments achieve their intended purpose of providing storage for passenger baggage items, there is a need for a new and improved system and method for vehicle baggage storage and retention.

SUMMARY

According to several aspects, a baggage storage and retention system includes a vehicle seat having a seatbelt assembly generating a seatbelt locked signal when a passenger in the vehicle seat closes the seatbelt assembly defining a seatbelt closed condition. A vehicle storage compartment has a strap and/or a lock assembly. The strap assembly generates a strap locked signal when a baggage item is placed in the vehicle storage compartment, engaged with the baggage item and closed defining a strap assembly closed condition. A seatbelt unlock signal is generated when the seatbelt assembly is unlocked. A baggage unlock signal designated to the strap assembly is generated when the seatbelt unlock signal is generated. The baggage unlock signal permits the passenger to unlock the strap assembly and remove the baggage item.

In another aspect of the present disclosure, a passenger communication device has an application in communication with a passenger and baggage identification system, the passenger and baggage identification system identifying one of a seatbelt open condition or the seatbelt closed condition is present when queried by a user.

In another aspect of the present disclosure, the passenger and baggage identification system includes a screen to identify one of a strap assembly open condition or the strap assembly closed condition of the strap assembly in the vehicle storage compartment when queried by the user.

In another aspect of the present disclosure, the seatbelt locked signal is forwarded to the passenger and baggage identification system. The strap locked signal is forwarded to the passenger and baggage identification system. The passenger and baggage identification system links the passenger in the vehicle seat and the baggage item upon receipt of both the seatbelt locked signal and the strap locked signal.

In another aspect of the present disclosure, a compartment cover rotated and manually positioned to releasably cover baggage items in the vehicle storage compartment.

In another aspect of the present disclosure, the compartment cover is substantially transparent and includes a lamp which illuminates the compartment when the compartment lid is opened.

In another aspect of the present disclosure, a compartment divider substantially extends across an entire opening of the storage compartment in a closed position. The compartment divider is moved to allow a first passenger to place a baggage item of the first passenger into a bottom portion of the storage compartment, and then placed over the baggage item of the first passenger. A baggage item of a second passenger when placed on top of the closed compartment divider provides individual split storage for personalized storage during a ride share event of the first and second passengers.

In another aspect of the present disclosure, the compartment divider is latched after placement of the baggage item of the first passenger and designated to the seatbelt assembly of the first passenger.

In another aspect of the present disclosure, a folding compartment divider is connected at a connection location to a first wall of the storage compartment and at an opposite releasable connection location to an opposite or second wall of the storage compartment. The folding compartment divider includes a fold line which separates a body of the folding compartment divider into a first body portion deployed to substantially cover baggage items in a first section of the storage compartment, and a second body portion deployed to substantially cover baggage items in a second section of the storage compartment.

In another aspect of the present disclosure, each of the first body portion and the second body portion of the folding compartment divider are individually latched and designated to one of the seatbelt assembly and to a different second seatbelt assembly.

According to several aspects, a baggage storage and retention system includes a first vehicle seat of a vehicle receiving a first passenger in the vehicle. A second vehicle seat of the vehicle receives a second passenger in the vehicle. Each of the vehicle seats has a seatbelt assembly generating a seatbelt locked signal when one of the first or second passengers seated in the vehicle seat closes the seatbelt assembly defining a seatbelt closed condition. A vehicle storage compartment has multiple strap assemblies. A first one of the strap assemblies generates a first strap locked signal when a first baggage item of the first passenger is placed in the vehicle storage compartment, engaged with the first baggage item and closed defining a strap assembly closed condition. A passenger and baggage identification system receives the seatbelt locked signal and the first strap locked signal and links the first passenger to the first seat and the first baggage item to the first passenger.

In another aspect of the present disclosure, a seatbelt unlock signal is generated when the seatbelt assembly of the first seat is unlocked. A baggage unlock signal designated to the first one of the strap assemblies is generated when the seatbelt unlock signal is generated. The baggage unlock signal permits the first passenger to unlock the first one of the strap assemblies and remove the first baggage item.

In another aspect of the present disclosure, the baggage unlock signal designated to the first one of the strap assemblies is not linked to the second passenger or the second vehicle seat thereby preventing the second passenger from unlocking the first one of the strap assemblies or removing the first baggage item.

In another aspect of the present disclosure, a second one of the strap assemblies generates a second strap locked signal when a second baggage item of the second passenger is placed in the vehicle storage compartment, engaged with the second baggage item and closed.

In another aspect of the present disclosure, the passenger and baggage identification system receives the seatbelt locked signal from the second vehicle seat and the second strap locked signal and links the second passenger to the second vehicle seat and the second baggage item to the second passenger. A baggage unlock signal designated to the second one of the strap assemblies is generated when a seatbelt unlock signal of the second vehicle seat is generated. The baggage unlock signal permits the second passenger to unlock the second one of the strap assemblies and remove the second baggage item.

In another aspect of the present disclosure, the passenger and baggage identification system generates a reminder signal forwarded to a communication device of the first passenger if the first one of the strap assemblies is not unlocked after the first passenger unlocks the seatbelt assembly of the first vehicle seat.

In another aspect of the present disclosure, the first passenger via a passenger communication device in communication with the passenger and baggage identification system preselects the first vehicle seat and the first one of the strap assemblies based on an availability of the first vehicle seat and the second vehicle seat and a volume of the storage compartment.

In another aspect of the present disclosure, the passenger and baggage identification system preselects the first vehicle seat and the first one of the strap assemblies for the first passenger using input from the first passenger via a passenger communication device together with identification of the first baggage item.

According to several aspects, a method for controlling baggage storage and retention of a vehicle includes: a first passenger selecting a first vehicle seat of a vehicle; a second passenger selecting a second vehicle seat of the vehicle; generating a seatbelt locked signal from each of the vehicle seats when a seatbelt assembly of one of the first or second passengers seated in the vehicle seat closes the seatbelt assembly defining a seatbelt closed condition; creating a first strap locked signal when a first baggage item of the first passenger is placed in a vehicle storage compartment, engaged with a first one of multiple strap assemblies and closed; forwarding the seatbelt locked signal and the first strap locked signal to a passenger and baggage identification system; and linking the first passenger to the first seat and the first baggage item to the first passenger.

In another aspect of the present disclosure, the method further includes: generating a seatbelt unlock signal when the seatbelt assembly of the first seat is unlocked; and creating a baggage unlock signal designated to the first one of the strap assemblies when the seatbelt unlock signal is generated, the baggage unlock signal permitting the first passenger to unlock the first one of the strap assemblies and remove the first baggage item.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
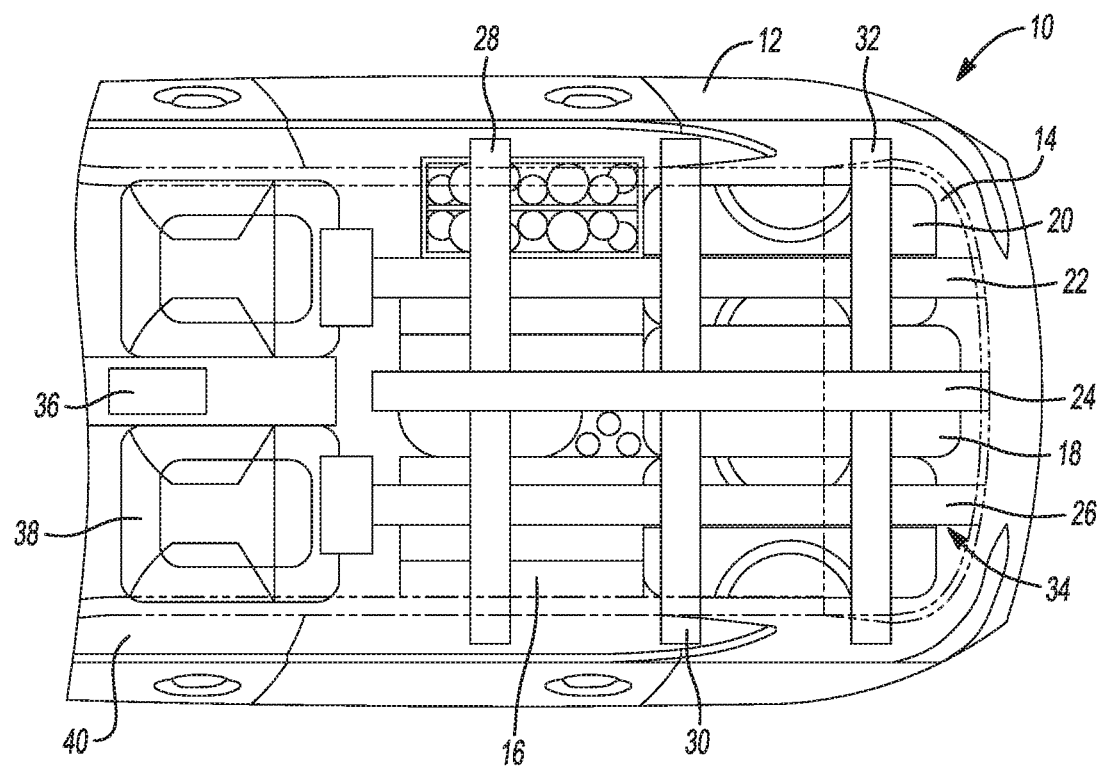
FIG. 1 is a partial cross-sectional top plan view of a baggage storage and retention system according to an exemplary embodiment.

Referring to FIG. 1, a baggage storage and retention system 10 is provided for a vehicle 12 such as an autonomously operated vehicle used for example as a livery, delivery or ride-share vehicle, an electrically powered vehicle, a gas or a gas/electric hybrid powered vehicle, a truck, a bus or the like. The vehicle 12 includes a rear storage area defining a trunk 14 which is sized to receive at least one and according to several aspects multiple articles of baggage 18. The baggage 18 can include but is not limited to luggage articles, boxes, trunks, grocery bags, and/or any loose or manually carried articles 20 of at least one passenger of the vehicle 12.

Multiple baggage containment straps of the baggage storage and retention system 10 are provided in the trunk 14, which can include a first fore-aft directed strap 22, a second fore-aft directed strap 24, and a third fore-aft directed strap 26. The baggage containment straps can also include a first side-to-side directed strap 28, a second side-to-side directed strap 30 and a third side-to-side directed strap 32. A total quantity of the baggage containment straps, as well as the individual quantity of the fore-aft directed straps and the side-to-side directed straps can vary depending on a storage volume of the trunk 14. The baggage containment straps collectively define a baggage containment sub-system 34. The baggage containment sub-system 34 is in communication with a passenger and baggage identification system 36 also in communication with at least one passenger seat 38 located in a passenger compartment 40 of the vehicle 12.

Figure 2:
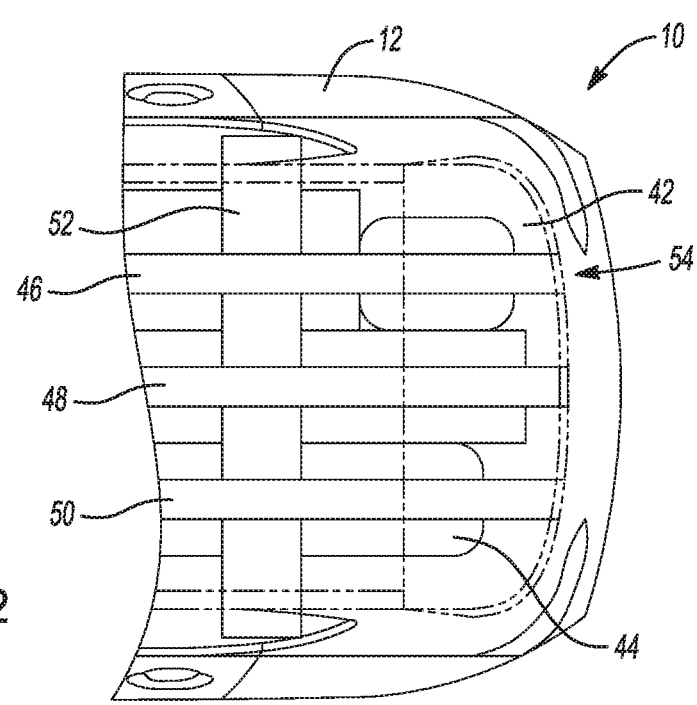
FIG. 2 is a partial cross-sectional top plan view modified from FIG. 1 to show a frunk.

Referring to FIG. 2 and again to FIG. 1, the vehicle 12 can also include a forward storage area defining a frunk 42 which can store articles of baggage 44 of any one of the passengers of the vehicle 12. The frunk 42 provides a first fore-aft directed strap 46, a second fore-aft directed strap 48, and a third fore-aft directed strap 50. A total quantity of the baggage containment straps of the frunk 42, as well as the individual quantity of the fore-aft directed straps and the side-to-side directed straps can vary depending on the storage volume of the frunk 42. In the example of FIG. 2, the frunk 42 is smaller in volume than the trunk 14 of FIG. 1, therefore the baggage containment straps include only a first side-to-side directed strap 52. The baggage containment straps of the frunk 42 collectively define a baggage containment sub-system 54. The baggage containment sub-system 54 is also in communication with the passenger and baggage identification system 36 of the vehicle 12.

Referring to FIG. 3 and again to FIGS. 1 and 2, a simplified version of the baggage storage and retention system 10 is illustrated to identify strap connectivity. A baggage containment sub-system 56 is modified from the baggage containment sub-system 34 to provide fewer baggage containment straps in a trunk 58 of a vehicle 60. The baggage containment straps include a first fore-aft directed strap 62 and a second fore-aft directed strap 64 which each extend away from a stowed condition in a deployment direction 66. The baggage containment straps also include a first side-to-side directed strap 68 and a second side-to-side directed strap 70 which each extend away from a stowed condition in a deployment direction 72. The first fore-aft directed strap 62 both extends from and automatically retracts into a strap housing 74 fixed for example to a rear trunk wall 76. The second fore-aft directed strap 64 both extends from and automatically retracts into a strap housing 78 also fixed to the rear trunk wall 76. The first fore-aft directed strap 62 is releasably connected to a first buckle 80 fixed to a forward trunk wall 82, and the second fore-aft directed strap 64 is releasably connected to a second buckle 84 also fixed to the forward trunk wall 82. It is noted the straps identified herein can also be provided as a hook assembly or as both a strap and hook assembly.

The first side-to-side directed strap 68 both extends from and automatically retracts into a strap housing 86 fixed for example to a right trunk wall 88. The second side-to-side directed strap 70 both extends from and automatically retracts into a strap housing 90 also fixed to the right trunk wall 88. The first side-to-side directed strap 68 is releasably connected to a third buckle 92 fixed to a left trunk wall 94, and the second side-to-side directed strap 70 is releasably connected to a fourth buckle 96 also fixed to the left trunk wall 94. The straps at one side and the buckles on the opposite side of the trunk or frunk, in multiple places, releasably retain baggage items in-place, for example with individual ones of the straps looped in handle of one of the baggage items. It is noted the number of straps, the orientation of the straps, and direction of strap extension or retraction can vary from that described above depending on a geometry of the storage compartment. For example, strap buckles can be placed at outer walls as noted, in the center of the storage compartment to centrally lock down a baggage item, and in close proximity to the strap housings depending on storage compartment configuration or to accommodate baggage items of multiple different geometries.

As each of the straps engages one of the buckles, for example as the first side-to-side directed strap 68 engages the third buckle 92 a strap locked signal is generated and forwarded to the passenger and baggage identification system 36 specifically identifying which baggage item belonging to a specific identified user or passenger is retained by the first side-to-side directed strap 68. The same user or passenger also identifies their ownership of the baggage item retained by the first side-to-side directed strap 68 by identifying and engaging a predetermined seat belt of one of the passenger seats such as the passenger seat 38 described in reference to FIG. 1. The passenger and baggage identification system 36 ensures each user or passenger can only remove their own baggage items from a trunk or frunk. For example, from the example above, following a ride share event the third buckle 92 can only be released when a first passenger who is co-identified with the defined seat belt corresponding to the designated first side-to-side directed strap assembly 68 first opens or unlocks his or her seat belt. A different second user or passenger opening or unlocking their seatbelt will not be communicated to the strap assembly 68, therefore the second passenger will not be able to access the baggage of the first passenger.

Figure 3:
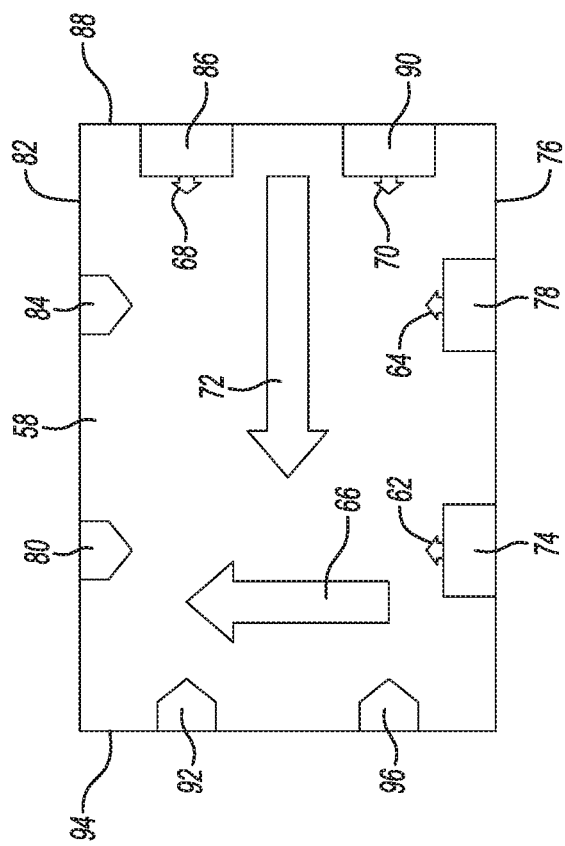
FIG. 3 is an assembly view of a strap and/or a lock assembly of FIG. 1.
Figure 4:
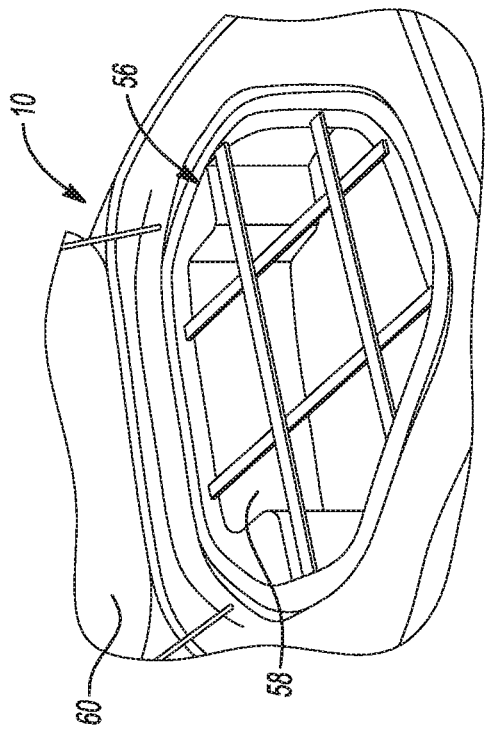
FIG. 4 is a top plan view of an exemplary strap and buckle assembly used for the strap assemblies of the present disclosure.
Figure 4:
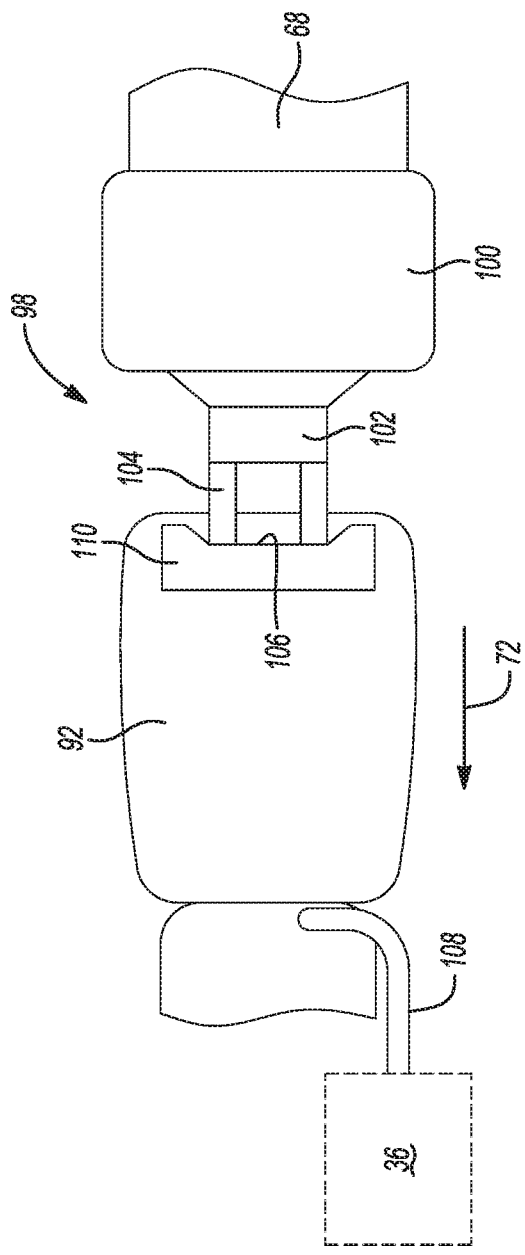

Referring to FIG. 4 and again to FIG. 3, an exemplary strap assembly 98 is common to each of the straps of the present disclosure, therefore the following discussion of the first side-to-side directed strap assembly 68 applies equally to each strap assembly and the remaining strap assemblies are therefore not discussed further herein. The strap assembly 98 includes the first side-to-side directed strap 68 connected to a strap head 100, from which a buckle member 102 extends. The first side-to-side directed strap 68 is connected to the strap housing 86 which includes a retraction feature such as a spring biased member which automatically acts to retract the first side-to-side directed strap 68 after extension away from the strap housing 86. The buckle member 102 may include a male extending connector 104 which extends in the deployment direction 72 to be slidaby received in a latch member 106 of the third buckle 92 and releasably coupled therein.

Coupling of the buckle member 102 with the latch member 106 generates a strap assembly closed signal which is transmitted by a signal wire 108 (or optionally wirelessly transmitted) to the passenger and baggage identification system 36. A manual release member 110 can be operated to release the latch member 106 only after the passenger assigned to the baggage item secured by the first side-to-side directed strap 68 subsequently releases the vehicle seat belt designated to that passenger.

Figure 5:
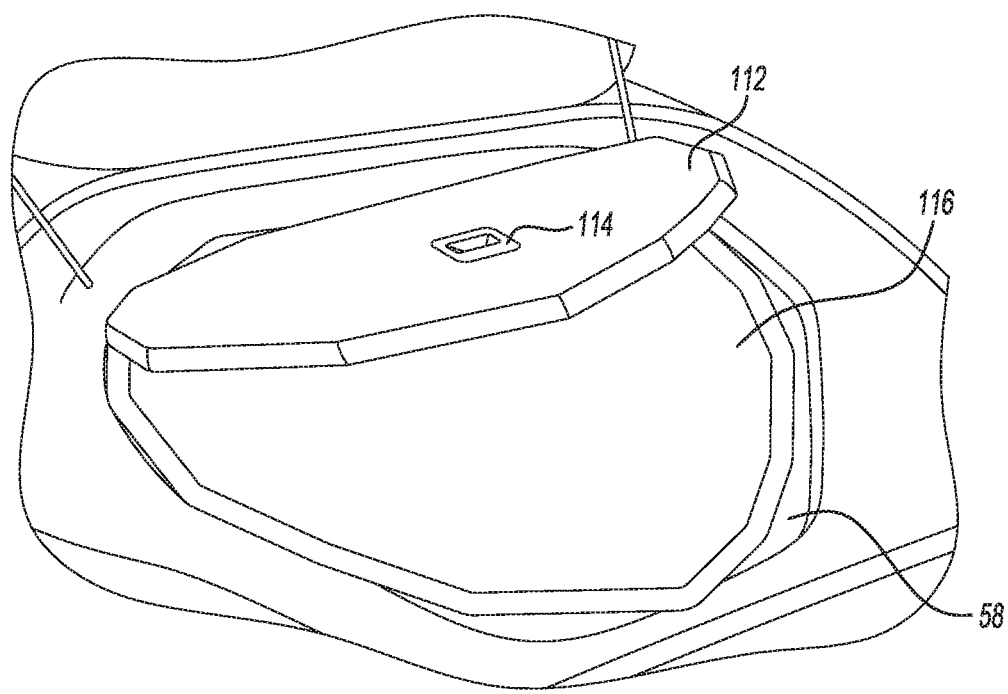
FIG. 5 is a rear perspective view looking forward of a compartment cover and a compartment divider of the present disclosure.

Referring to FIG. 5, according to several aspects, the baggage storage and retention system 10 can also provide a compartment cover 112 that can be sized for any one or both of the trunk such as the trunk 58 or the frunk such as the frunk 42. The compartment cover 112 is rotated and manually positioned to releasably cover baggage items in either the trunk or the frunk. According to several aspects, the compartment cover 112 is provided with a lamp 114 which illuminates the compartment when the compartment lid is opened. The compartment cover 112 can be opaque, with light emitted by the lamp 114 acting to illuminate the trunk or the frunk. The compartment cover 112 can also be substantially a light transparent polymeric material to allow passengers to view the baggage items contained in the trunk or the frunk, even with the compartment cover 112 in the closed position.

According to several aspects, in lieu of individual baggage straps, a compartment divider 116 is provided, which can substantially extend across an entire opening of the trunk or the frunk in a closed position shown. The compartment divider 116 can be made of a substantially flexible or a semi-rigid material such as plastic or leather. In use the compartment divider 116 can be moved to allow a first passenger to place baggage items into a bottom or lowermost portion of the trunk or the frunk, and then placed over the baggage items of the first passenger and latched and designated to a specific vehicle seat belt for the first passenger similar to the strap assembly 98 discussed in reference to FIG. 4. The baggage items of a second passenger can then be placed on top of the closed compartment divider 116 to thereby provide individual split storage for personalized storage during a ride share event of the first and second passengers. The compartment divider 116 is then latched and designated to a specific vehicle seat belt for the second passenger similar to the strap assembly 98 discussed in reference to FIG. 4.

Figure 6:
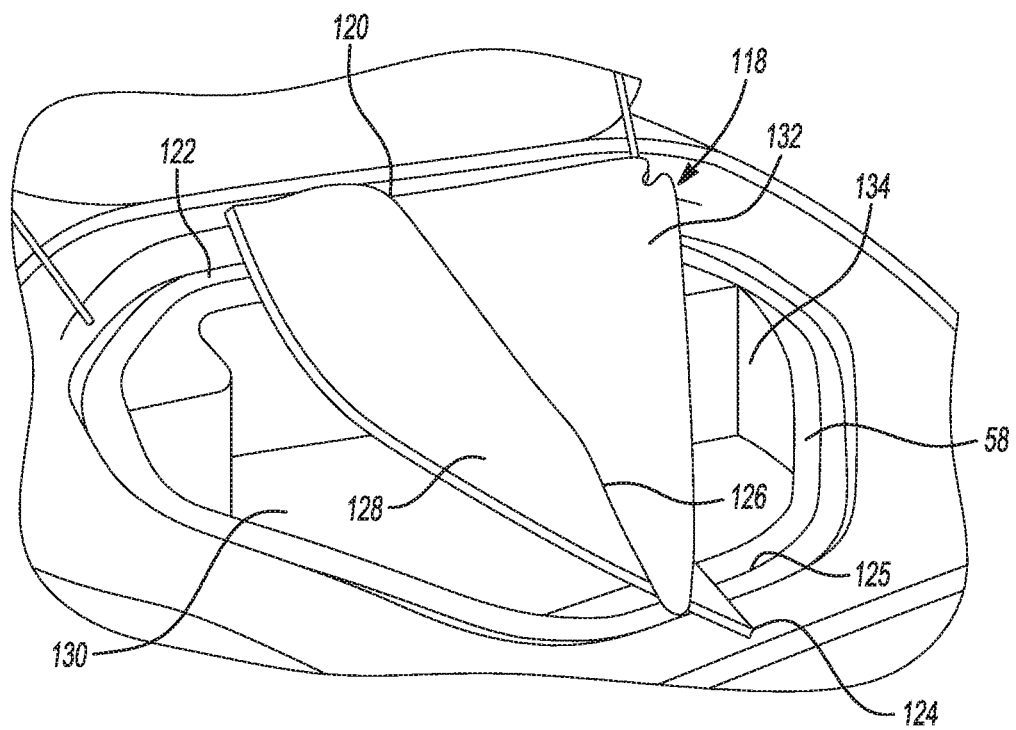
FIG. 6 is a rear perspective view looking forward of a folding compartment divider of the present disclosure.

Referring to FIG. 6 and again to FIG. 5, in lieu of the compartment divider 116 a folding compartment divider 118 can be provided. The folding compartment divider 118 can be connected at a connection location 120 to a first wall 122 of the trunk such as the trunk 58 or a frunk and at an opposite releasable connection location 124 to an opposite or second wall 125 of the trunk or frunk. The folding compartment divider 118 includes a bend or fold line 126 which separates a body of the folding compartment divider 118 into a first body portion 128 which can be deployed to substantially cover baggage items in a first section 130 of the trunk or frunk, and a second body portion 132 which can be deployed to substantially cover baggage items in a second section 134 of the trunk or frunk. The first body portion 128 and the second body portion 132 provide at least a visual indication of the filled baggage locations between two different passengers. According to several aspects, each of the first body portion 128 and the second body portion 132 can also be individually latched and designated to a specific vehicle seat belt similar to the strap assembly 98 discussed in reference to FIG. 4.

Referring to FIG. 7 and again to FIGS. 1 through 4, the baggage storage and retention system 10 includes the passenger and baggage identification system 36 which may include a computer, at least one processor, and computer memory which can be remotely located in a centralized processing unit, or provided with individual vehicles. When the baggage containment straps of the baggage storage and retention system 10 are connected to individual or groups of baggage items, individual lock systems designated as a first lock system #1, a second lock system #2, a third lock system #3, and a fourth lock system #4 are defined. For example, a first baggage item 136 is connected to the first fore-aft directed strap 62 defining the first lock system #1, a second baggage item 138 is connected to the second fore-aft directed strap 64 defining the second lock system #2, a third baggage item 140 is connected to the second side-to-side directed strap 70 defining the third lock system #3, and a fourth baggage item 142 is connected to the first side-to-side directed strap 68 defining the fourth lock system #4. The passenger and baggage identification system 36 tracks the status of each of the lock systems, including the first lock system #1, the second lock system #2, the third lock system #3, and the fourth lock system #4, as well as tracking available storage space in the trunk or the frunk based on which if any of the lock systems are not presently engaged to retain baggage items.

Each passenger can communicate with the passenger and baggage identification system 36 of the vehicle 12 using a communication device 144 such as a smart phone, tablet, computer, or the like via an application that communicates with the passenger and baggage identification system 36 and therefore with the baggage storage and retention system 10. The passenger initially identifies availability of the vehicle 12, and then can identify if sufficient storage space is available in the vehicle 12 to accommodate the passenger's baggage items. Information about the status of the vehicle 12 and its storage capacity can be presented to the passenger on a display screen 146 where selections and confirmations or reservations can be loaded and retrieved. Reservation of a passenger seat can be confirmed by confirmation of an available or open seatbelt 148, and reservation of storage for a passenger baggage space 150 can be made by confirmation of an available or open baggage strap assembly such as the strap assembly 98. If more than one strap assembly is required to accommodate the passenger's baggage, confirmation of available space can also be obtained at the same time the vehicle reservation is made. The passenger and baggage identification system 36 can also distinguish between large and small passenger baggage items as identified by the passenger. For example, if the passenger identifies a single large baggage item will be carried, the passenger and baggage identification system 36 can reserve space required for two or more small baggage items, and reserve two or more retention straps.

Thereafter, the reserved vehicle 12, the reserved seating assignment based on the reserved seatbelt 148, and the reserved storage space based on the available passenger baggage space 150 is saved in a memory of the passenger and baggage identification system 36 until completion of the passenger trip. When the passenger reaches his or her travel destination the passenger signifies trip completion by unlocking the reserved seatbelt 148 which generates a seatbelt unlock signal 152. The passenger and baggage identification system 36 identifies if the passenger is linked to one or more baggage items by, for example, the signal received when the strap assembly 98 is locked defining a strap assembly locked condition, or when the strap assembly 98 is unlocked defining a strap assembly open condition. When baggage confirmation is received, the seatbelt unlock signal generates a baggage unlock signal 154 which allows the passenger to manually unlock the strap assembly 98 having the passenger's baggage item. As the passenger unlocks the one or more strap assemblies designated to the passenger to remove any baggage items, a ride complete signal 156 is generated. The ride complete signal 156 is also generated if there are no baggage items associated with the passenger and the passenger unlocks the reserved seatbelt 148.

The passenger and baggage identification system 36 generates a reminder signal 158 which is forwarded to the communication device 144 of only the baggage linked passenger if the passenger forgets to unlock the one or more strap assemblies designated to the passenger to remove any baggage items. The reminder signal 158 can be generated at any time interval following the time the ride complete signal 156 is generated and can be repeated at a predetermined time interval following ride completion. The reminder signal 158 can generate an alarm and/or a predefined text message 160 directed only to a linked passenger at the communication device 144 of the linked passenger, or the reminder signal 158 can also be forwarded to a vehicle built-in alert system. The vehicle departs after the passenger removes the baggage items. If, after the reminder signal 158 is generated, the vehicle departs with any of the passenger's linked baggage items still remaining in a storage compartment, information related to the remaining linked baggage item or items is forwarded to a system support team to track and alert the linked passenger of the unclaimed baggage.

Figure 7:
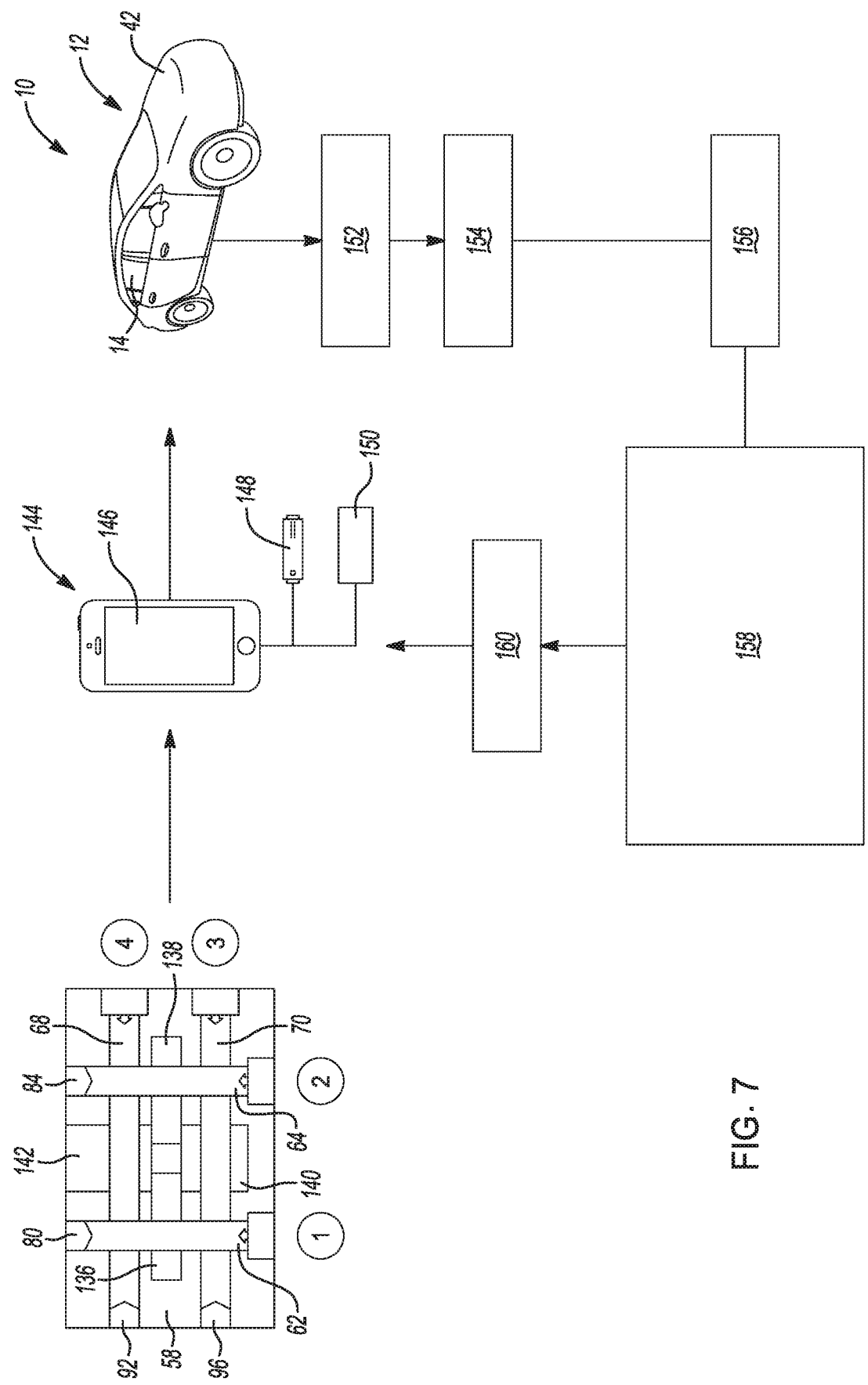
FIG. 7 is a diagrammatic presentation of the baggage system of FIG. 1.
Figure 8:
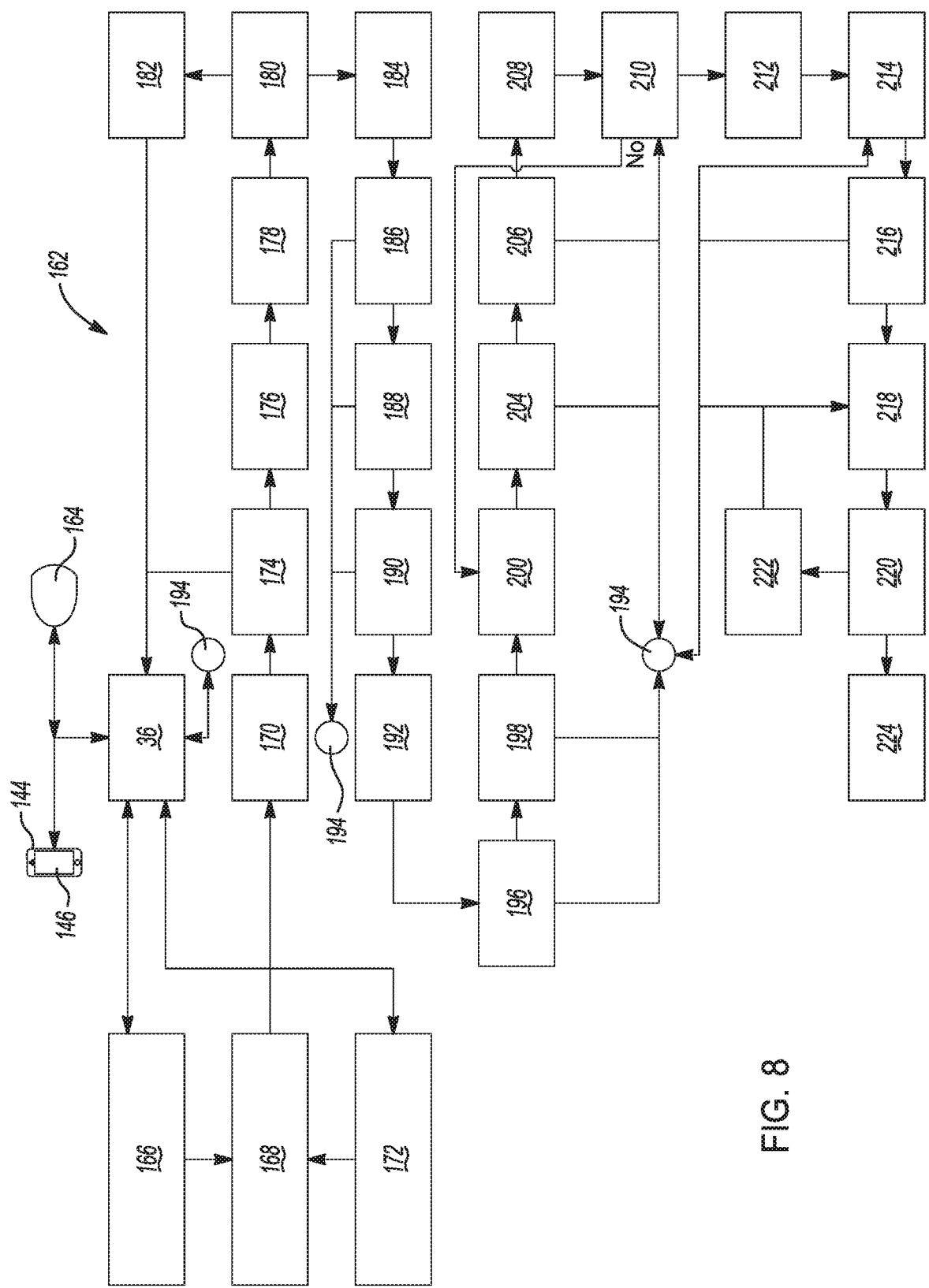
FIG. 8 is an enhanced diagrammatic presentation of the baggage storage and retention system of FIG. 7.

Referring to FIG. 8 and again to FIG. 7, an enhanced flow diagram 162 identifies additional features of the baggage storage and retention system 10. As previously noted the system user may communicate with the passenger and baggage identification system 36 using the user's communication device 144, and information concerning use of the vehicle 12 may also be displayed on a vehicle display system 164. For the selected vehicle 12 the passenger and baggage identification system 36 in a retrieval step 166 retrieves a signal defining a compartment baggage lock usage and displays available lock(s) for the vehicle 12 selected. In a selection step 168 the user selects one or more locks that are required in the storage compartment defined as the trunk 14 or the frunk 42, or the user selects a quantity or number of baggage items that will be brought to the vehicle 12. In an allocation step 170 the passenger and baggage identification system 36 allocates the user selected lock or locks to the identified user, or, based on the number or quantity of baggage items provided the passenger and baggage identification system 36 allocates one or more lock numbers to the user. In lieu of performing the retrieval step 166, in a conversion step 172 for the selected vehicle 12 the passenger and baggage identification system 36 retrieves a signal defining baggage lock usage and converts baggage lock usage to an amount of baggage space required based on a saved average volume per baggage item and signals a recommendation to the user of an available space in the vehicle 12 defining a number of baggage items that can be carried based on the total volume of the storage compartment or a total storage volume of the vehicle 12. After completion of the conversion step 172 the selection step 168 followed by the allocation step 170 are performed.

After the allocation step 170 the passenger and baggage identification system 36 in a blocking step 174 blocks the selected baggage lock from further selection and links the lock number or numbers to the user. In a following sending step 176 the passenger and baggage identification system 36 together with a ride information system sends the selected lock number or numbers and a storage area layout map to the user. After the sending step 176 the vehicle 12 reaches the user at a pick-up step 178. In an opening step 180 the user opens the storage compartment of the vehicle 12, which generates a compartment latch ajar signal from a switch 182 to the passenger and baggage identification system 36. After the vehicle compartment latch is opened in an alert step 184 the vehicle 12 generates an alert signal to the user's communication device 144 indicating which baggage lock or locks are allocated to the user, which can include a user name. Following the alert step 184 in a locking step 186 the user engages the allocated baggage lock or locks to the user's baggage items, and in a following closing step 188 the user closes the storage compartment latch. The user in a following opening step 190 opens a vehicle door and in a seating step 192 selects and sits in a predesignated seat in the vehicle 12, or if a seat has not been predesignated selects any available seat in the vehicle 12. After each step above, a notification 194 is sent to the passenger and baggage identification system 36.

With the user in position in the vehicle seat, in a linking step 196 the passenger and baggage identification system 36 "links" the now engaged baggage lock or locks to the user selected seat by engagement of a seat belt by the user. The linking step 196 creates a linked relationship for example between a first passenger seated in a first vehicle seat and a first baggage item of the first passenger for example by a "first-in" "second-in", "third-in" system or the like. The assigned baggage lock remains linked until the user in the vehicle 12 subsequently unlocks the seat belt for the defined seat location. In an optional allocation step 198 if the seat selected by the user has not been previously allocated to the user, the user can link the selected seat to the allocated baggage lock using the display screen 146 of the user's communication device 144. In a confirmation step 200, the selected baggage lock or locks remain locked until the user is ready to offboard the vehicle 12. At a destination reached step 204, when the vehicle 12 reaches the desired destination and stops, the user unlocks the seat belt. In an opening step 206 the user then opens the vehicle door. After each step above, a notification 194 is sent to the passenger and baggage identification system 36.

In a second compartment opening step 208 the user again opens the storage compartment latch. In a state change step 210 the passenger and baggage identification system 36 checks if the user designated seat belt or door lock state has changed condition to an unlocked state. If the response to the query in the state change step 210 is NO, the system returns to the confirmation step 200. If the response to the query in the state change step 210 is YES, an alert signal 212 is generated and forwarded to the user's communication device 144 indicating which baggage locks the user has engaged for the user's baggage items. After the alert signal 212 is generated, in an unlocking step 214 the user can unlock the one or more selected baggage locks in the storage compartment to remove the user's baggage items. In a final closing step 216 the user closes the storage compartment latch. Again, after each step above, a notification 194 is sent to the passenger and baggage identification system 36.

In a latch check step 218, before the vehicle 12 starts away from the destination stop, the passenger and baggage identification system 36 checks if the storage compartment latch is closed. In a following lock check step 220, a check is performed to determine if all of the user assigned baggage locks have been unlocked, indicating that all of the user's baggage items have been removed. If a response to each of the latch check step 218 and the lock check step 220 is YES, the vehicle 12 moves on to a next location. If a response to either of the latch check step 218 or the lock check step 220 is NO, in a reminder step 222, a reminder signal is generated and forwarded to the user's communication device 144 identifying that the baggage compartment latch may still be open or that the user should check to identify if one or more items of the user's baggage may still be in the storage compartment. The reminder signal may be in the form of at least one of a text message, a voice signal or an illuminated light.

In this application, including the definitions below, the term computer may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more processors. The term shared memory encompasses a single memory that stores some or all code from multiple processors. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A baggage storage and retention system of the present disclosure offers several advantages. These include provision of a secured passenger usage of a rear or front vehicle compartment for storing passenger baggage items. The present system also provides for the positive retention of one or more items of baggage in a vehicle frunk or a trunk rear compartment. The present system also allows stored baggage items to be linked to a particular passenger, which allows notification to be sent only to the linked passenger if a baggage item is not retrieved upon completion of the trip.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A baggage storage and retention system, comprising:
   a first vehicle seat of a vehicle receiving a first passenger in the vehicle;
   a second vehicle seat of the vehicle receiving a second passenger in the vehicle;
   each of the first and second vehicle seats having a seatbelt assembly generating a seatbelt locked signal when one of the first or second passengers seated in one of the first or second vehicle seats closes the seatbelt assembly defining a seatbelt closed condition;
   a vehicle storage compartment having multiple strap assemblies, a first one of the strap assemblies generating a first strap locked signal when a first baggage item of the first passenger is placed in the vehicle storage compartment, engaged with the first baggage item and closed defining a strap assembly closed condition; and
   a passenger and baggage identification system receiving the seatbelt locked signal and the first strap locked signal and linking the first passenger to the first seat and the first baggage item to the first passenger.

2. The baggage storage and retention system of claim 1, wherein:
   a seatbelt unlock signal is generated when the seatbelt assembly of the first seat is unlocked; and
   a baggage unlock signal designated to the first one of the strap assemblies is generated when the seatbelt unlock signal is generated, the baggage unlock signal permitting the first passenger to unlock the first one of the strap assemblies and remove the first baggage item.

3. The baggage storage and retention system of claim 2, wherein the baggage unlock signal designated to the first one of the strap assemblies is not linked to the second passenger or the second vehicle seat thereby preventing the second passenger from unlocking the first one of the strap assemblies or removing the first baggage item.

4. The baggage storage and retention system of claim 1, wherein a second one of the strap assemblies generates a second strap locked signal when a second baggage item of the second passenger is placed in the vehicle storage compartment, engaged with the second baggage item and closed.

5. The baggage storage and retention system of claim 4, wherein the passenger and baggage identification system receives the seatbelt locked signal from the second vehicle seat and the second strap locked signal and links the second passenger to the second vehicle seat and the second baggage item to the second passenger; and
   a baggage unlock signal designated to the second one of the strap assemblies is generated when a seatbelt unlock signal of the second vehicle seat is generated, the baggage unlock signal permitting the second passenger to unlock the second one of the strap assemblies and remove the second baggage item.

6. The baggage storage and retention system of claim 1, wherein the passenger and baggage identification system generates a reminder signal forwarded to a communication device of the first passenger or a vehicle built-in alert system if the first one of the strap assemblies is not unlocked after the first passenger unlocks the seatbelt assembly of the first vehicle seat.

7. The baggage storage and retention system of claim 1, wherein the first passenger via a passenger communication device in communication with the passenger and baggage identification system preselects the first vehicle seat and the first one of the strap assemblies based on an availability of the first vehicle seat and the second vehicle seat and a volume of the storage compartment.

8. The baggage storage and retention system of claim 1, wherein the passenger and baggage identification system preselects the first vehicle seat and the first one of the strap assemblies for the first passenger using input from the first passenger via a passenger communication device together with identification of the first baggage item.

9. A method for controlling baggage storage and retention of a vehicle, comprising:
   providing a baggage storage and retention system, comprising a first vehicle seat of the vehicle receiving a first passenger in the vehicle, a second vehicle seat of the vehicle receiving a second passenger in the vehicle, each of the first and second vehicle seats having a seatbelt assembly generating a seatbelt locked signal when one of the first or second passengers seated in one of the first or second vehicle seats closes the seatbelt assembly defining a seatbelt closed condition, a vehicle storage compartment having multiple strap assemblies, a first one of the strap assemblies generating a first strap locked signal when a first baggage item of the first passenger is placed in the vehicle storage compartment, engaged with the first baggage item and closed defining a strap assembly closed condition and a passenger and baggage identification system receiving the seatbelt locked signal and the first strap locked signal and linking the first passenger to the first seat and the first baggage item to the first passenger;
   the first passenger selecting the first vehicle seat of the vehicle;
   generating the seatbelt locked signal when the seatbelt assembly of the first vehicle seat is closed by the first passenger seated in the first vehicle seat;
   creating the first strap locked signal when the first baggage item of the first passenger is placed in the vehicle storage compartment, engaged with the first one of multiple strap assemblies and closed;
   forwarding the seatbelt locked signal and the first strap locked signal to the passenger and baggage identification system; and linking the first passenger to the first seat and the first baggage item to the first passenger.

10. The method for controlling baggage storage and retention of a vehicle of claim 9, further including:
generating a seatbelt unlock signal when the seatbelt assembly of the first seat is unlocked; and
creating a baggage unlock signal designated to the first one of the strap assemblies when the seatbelt unlock signal is generated, the baggage unlock signal permitting the first passenger to unlock the first one of the strap assemblies and remove the first baggage item.

\* \* \* \* \*